United States Patent [19]

Overton, Jr.

[11] Patent Number: 4,928,624
[45] Date of Patent: May 29, 1990

[54] POWDER SPRAY BOOTH WITH OVERSPRAY COLLECTION SYSTEM

[76] Inventor: Duncan E. Overton, Jr., 1016 Oglewood Ave., Knoxville, Tenn. 37917

[21] Appl. No.: 240,075

[22] Filed: Sep. 2, 1988

Related U.S. Application Data

[63] Continuation-in-part of Ser. No. 12,798, Feb. 9, 1987, abandoned.

[51] Int. Cl.⁵ ............................................. B05B 15/12
[52] U.S. Cl. .................................. 118/308; 118/326; 98/115.2; 55/273; 55/302
[58] Field of Search ................... 118/326, 308, 324; 98/115.2; 55/273, 302

[56] References Cited

U.S. PATENT DOCUMENTS

| | | | |
|---|---|---|---|
| 3,777,706 | 12/1973 | Kaufman | 118/326 |
| 3,791,341 | 2/1974 | Diamond et al. | 118/7 |
| 3,905,785 | 9/1975 | Fabre | 55/96 |
| 4,227,260 | 10/1980 | Vojvodick et al. | 455/601 |
| 4,277,260 | 7/1981 | Browning | 55/273 |
| 4,378,728 | 4/1983 | Berkmann | 98/115.2 |
| 4,401,445 | 8/1983 | Browning | 55/96 |
| 4,409,009 | 10/1983 | Lissy | 55/302 |
| 4,471,715 | 9/1984 | Gubler et al. | 118/324 |
| 4,590,884 | 5/1986 | Kreeger | 118/308 |
| 4,723,505 | 2/1988 | Wilson et al. | 118/326 |

Primary Examiner—Shrive Beck
Attorney, Agent, or Firm—Pitts and Brittian

[57] ABSTRACT

A powder spray booth (10) for spray coating articles with resinous powder is disclosed. The booth comprises a spray chamber (12) which is secured to a base portion (14). The base portion (14) comprises a clean air plenum section (36) and a trough-like oversprayed powder collection section (34) which is located directly below the spray chamber (12). Filter media (50) are secured to cantilevered filter supports (52) mounted on an interior wall of the powder collection section in fluid communication with the clean air plenum section (36) and the spray chamber (12). The spray chamber (12) is provided with front (16) and rear (20) wall panels comprising lightweight nonconductive lift-up/slide-out panels which may be easily removed to provide wide open access to the spray chamber (12), filter media (50) and collection section (34) to facilitate cleaning and reduce downtime associated with color changeovers.

4 Claims, 3 Drawing Sheets

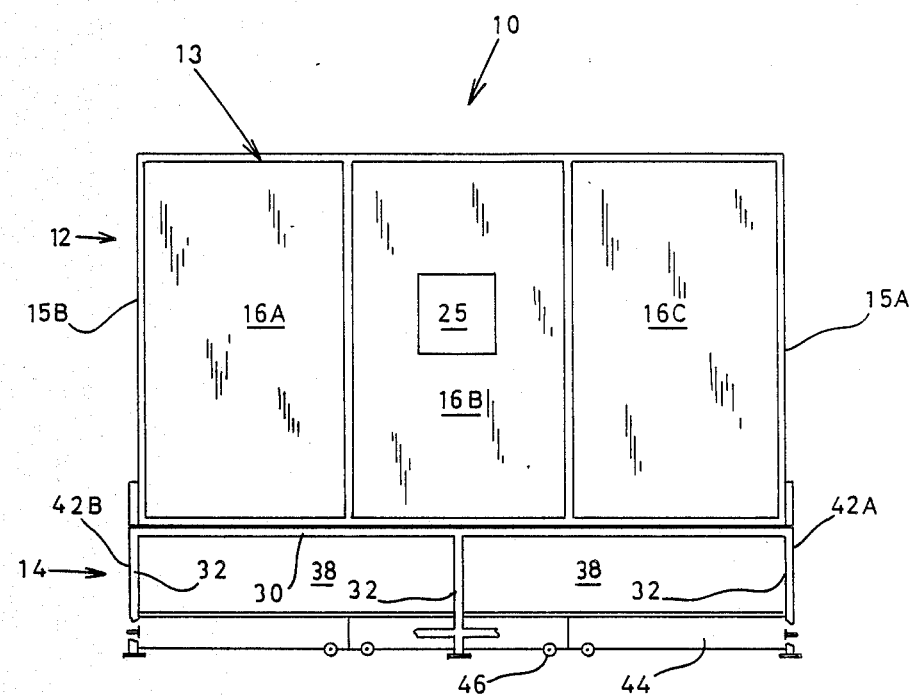
FIG. 2
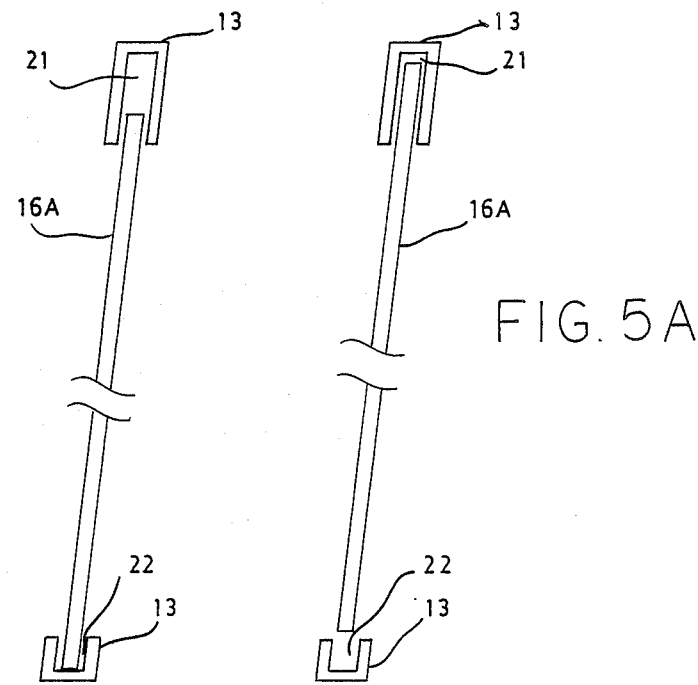
FIG. 5
FIG. 5A

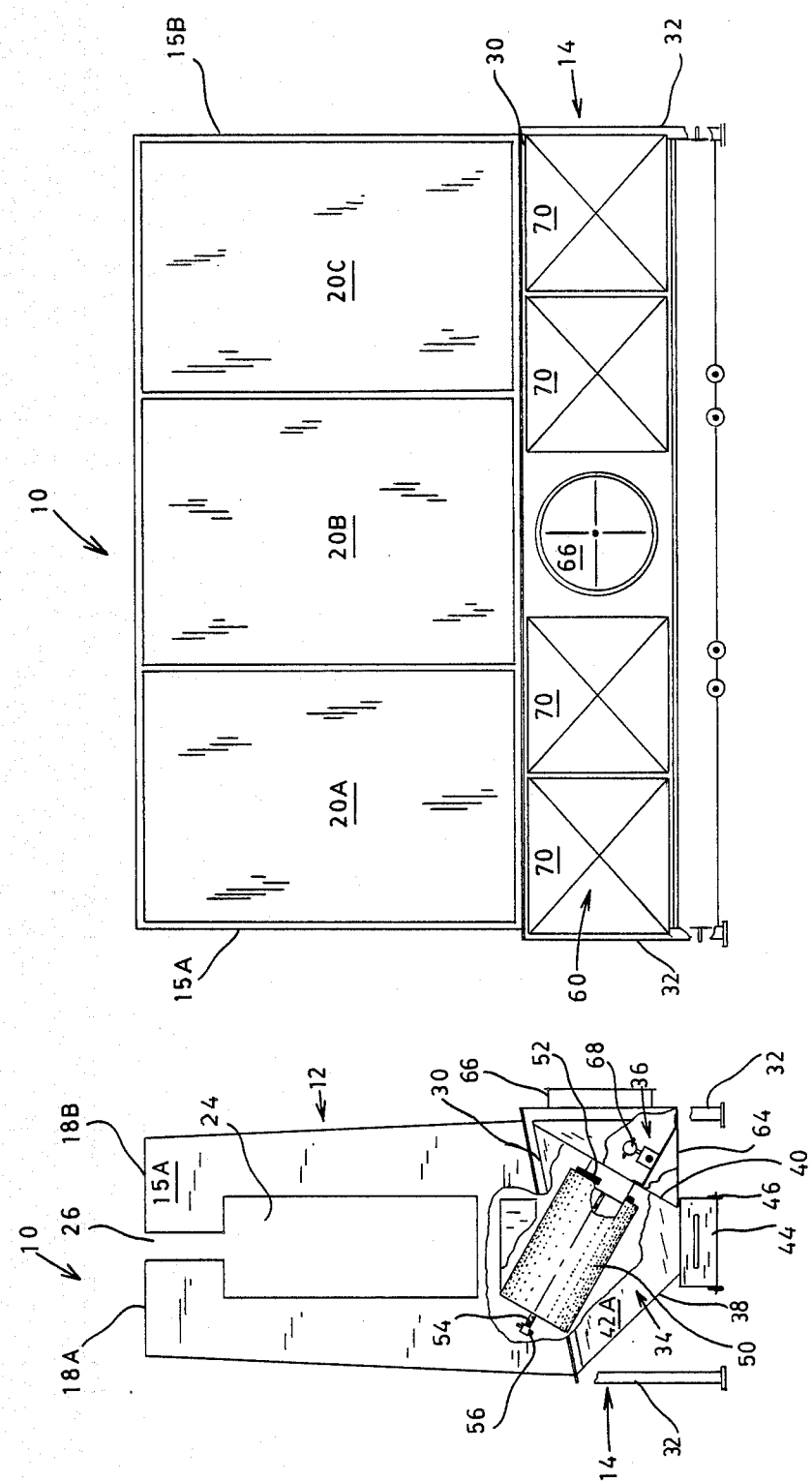

POWDER SPRAY BOOTH WITH OVERSPRAY COLLECTION SYSTEM

This is a Continuation-In-Part application based upon parent application Ser. No. 012,798, filed Feb. 9, 1987, entitled "Powder Collectors" and now abandoned.

TECHNICAL FIELD

This invention relates to a powder spray booth for spray coating articles with a resinous material, such booth including an oversprayed powder filter/recovery system integrally incorporated therein.

BACKGROUND ART

Processes for coating manufactured goods which utilize powdered coating materials and electrostatic attraction have found increasing popularity and an ever increasing number of applications in recent years. In accordance with such processes, a resin coating in powder form ("powder") is sprayed onto the articles to be coated using a spray gun in much the same manner as liquid paint is sprayed. The articles to be coated are electrically connected to one electrode of a DC power supply while the powder is provided with an opposite charge by connecting the other electrode of the DC power supply to the spray gun proximate the orifice from which the powder is sprayed. The resulting electrostatic attraction causes the powder to adhere to the articles sprayed. The articles are then heated to melt the powder, resulting in a permanent bonding between the powder coating and the article. Because there are no liquid solvents present as in conventional paint, the curing time is minimal. There are several advantages these processes over those which utilize liquid paint. The resulting coating has a more even thickness because the powder simply falls off when the coating reaches a desired thickness at which the electrostatic attraction falls to zero. This self-limiting characteristic of the process facilitates the coating of hard to reach areas without overcoating adjacent areas of the articles being sprayed. Thickness of the coating can be varied by varying the DC voltage of the power source and, therefore, the resulting electrostatic attraction. Unlike liquid paint, the oversprayed powder can be collected and reused so long as it is not contaminated.

Articles coated according to the above-described process must be sprayed in a spray booth specially designed to contain the oversprayed powder. The articles are usually transported through the booth using a conveyor system. Prior art booths have been designed to be used with either overhead conveyors or floor mounted spindle conveyors. Powder spray booths are generally provided with an air flow system, an air filtration system and a powder collection system. These systems generally cooperate to contain the powder within the booth and/or collection system and prevent contamination of the air outside the booth. Clean air is normally drawn into the booth through openings provided for conveying the articles to be coated into the booth as well as openings in the booth through which the spray guns are inserted. Some oversprayed powder will simply fall by gravity to a surface below the spraying area where it is directed to the collection system. The remaining powder which is entrained in the air is drawn through a filtration system where the powder is collected on filter media and the air is exhausted to a clean air plenum. Air flow is normally maintained by a blower which maintains a negative pressure in the clean air plenum. In order to maintain desired air flow through the booth, it is necessary to periodically "purge" the filters by directing a reverse pulse of compressed air through the filters to eject the collected powder. The ejected powder is of sufficient weight and concentration that it can be directed to a powder collection system.

Although equipment constructed in accordance with the foregoing description functions well for so long as it is being used to apply the same color coating, a problem arises when it becomes necessary to change the color of the coating being applied. A cross color contamination of the powder will result in an unacceptable coating. In order to avoid such contamination, it is necessary to conduct a thorough cleaning of the interior surfaces of the booth, the air filtration system, and the powder collection system. It is also necessary to replace the filter media whenever a color change is required because the periodic purges of the filters are not one hundred percent effective. Completing these steps which are necessary to effect a color change is a messy and time consuming operation. In the past, these changeovers resulted in down times of as much as several hours with prior art booths.

A number of prior art powder spray systems have been designed with the objective of reducing the down time associated with color changes. However, the results have been less than satisfactory. These systems incorporate filter and/or powder recovery components or modules which are separable from the spray booth portion of the system. For example, roll-away filter/recovery modules are disclosed in U.S. Pat. Nos.: 4,590,884; 4,378,728; 4,227,260; and 4,401,445. A removable self-contained recovery/filter system is disclosed in U.S. Pat. No. 4,409,009. In each of the above-mentioned patents, powder spray systems are disclosed in which down time for color changes is reduced by providing for replacement of the filter/recovery modules with a pre-cleaned module. This method of dealing with the problem is less than satisfactory. It increases the complexity and therefore the cost of the systems. Further, it requires that each system be provided with at least one spare filter/recovery module. These modules are expensive and still must be cleaned and the filter elements in them must be replaced before they can be reused for a different color powder.

In a powder spraying system, it is extremely important that the interior surfaces of the booth or spraying area be completely cleaned with all powder removed before changing the color of the powder being sprayed. The applicant is unaware of any prior art system which adequately addresses the problem of providing quick and complete access to the interior surfaces of the spray booth for cleaning.

In most larger prior art booths, it is necessary for someone to physically get inside the booth to accomplish and assure a complete cleaning. This is a less than satisfactory situation. Although down time can be reduced in prior art booths incorporating separable filter/recovery modules when a clean spare module is maintained, it is still necessary to clean the modules when they are changed out. The modules in these prior art booths also present problems of access. Accordingly, the time required to change out the filters in the modules and thoroughly clean the interior of the modules results in a substantial increase in the labor cost of the powder spraying operation.

Therefore, it is an object of the present invention to provide a powder spray booth which reduces down time associated with color changeovers.

It is a further object of the present invention to provide a powder spray booth which includes an integrally constructed filter/recovery system, whereby the interior of the spray booth and the filter/recovery system can be cleaned at the same time during color changeovers without increasing down time.

It is another object of the present invention to provide a powder spray booth having the advantage of quick and easy removal and replacement of filter media, thereby reducing down time.

It is yet another object of the present invention to provide a powder spray booth having wall panels which are light in weight and are quickly and easily removable and replaceable, thereby providing improved access to the interior of such booth and reducing downtime required for cleaning.

It is still another object of the present invention to provide a powder spray booth having an improved powder recovery system located immediately below the spray area of the booth, whereby the percentage of oversprayed powder which is recoverable is substantially increased.

It is also an object of the present invention to provide a powder spray booth having a removable hopper or drawer for the collection of oversprayed powder.

It is another object of the present invention to provide a powder spray booth which is designed to minimize the risk of explosion.

It is yet another object of the present invention to provide a powder spray booth which is relatively simple and inexpensive to manufacture and maintain.

DISCLOSURE OF THE INVENTION

Other objects and advantages will be accomplished by the present invention which provides an improved powder spray booth with integrated powder collector. The spray booth of the present invention comprises a base portion having a substantially rectangular horizontal cross-section, and a spray section defined by two oppositely disposed end panels, a front wall and a rear wall which extend vertically from the base portion and terminate in substantially co-planar top edge portions which define a top or ceiling section of the spray area. The end panels are each provided with openings through which articles to be sprayed can be conveyed via an overhead conveyor. The front and rear walls of the spray area are defined by frame members having channels for receiving therein one or more lightweight lift-up/slide-out panels, whereby such front and rear wall panels can be easily and quickly removed to provide wide open access to the booth for cleaning. In the preferred embodiment, the front and rear walls are sloped slightly inward. One or more of the wall panels can have openings cut therein to receive any of a variety of automatic or manual spray guns. The base portion includes frame means for the support of the entire booth, powder collection means, filter media and a clean : air plenum. The collection means includes a trough-like section located immediately below the above-described spray section, such trough-like section defining a substantially rectangular opening at its bottom. A removable hopper or drawer for receiving collected oversprayed powder is secured beneath the bottom opening defined by the trough-like section. Canister-type filter media are secured to a sloped wall portion of the trough-like section by cantilevered frame means secured to such wall. Openings are provided in the wall to which the filters are secured, whereby air is drawn from the spray area of the booth through the filter media into a clean air plenum which is further defined by the base portion of the booth. Powder which is entrained in the air drawn from the spray area is collected on the exterior (collector-side) of the filter media. Nozzles which are connected to a controlled source of compressed air are located inside the clean air plenum such that reverse pulses of air can be periodically directed back through the filter media to eject collected powder which then falls into the collection hopper. An opening is provided in a panel defined by the clean air plenum for connection to an exhaust blower which clean air plenum, thereby maintaining a negative atmospheric pressure in the spray area of the booth.

BRIEF DESCRIPTION OF THE DRAWINGS

The above-mentioned features of the invention will become more clearly understood from the following detailed description of the invention read together with the drawings in which:

FIG. 2 illustrates a front elevation view of a powder spray booth of the present invention.

FIG. 3 illustrates a side elevation view of a powder spray booth of the present invention with a cutaway section of the base portion of the booth shown.

FIG. 4 illustrates a rear elevation view of a powder spray booth of the present invention.

FIGS. 5 and 5A illustrate partial side elevation views, in section, of a wall panel of the spray chamber of a powder spray booth of the present invention. These figures illustrate the lift-up/slide-out character of such panels.

BEST MODE FOR CARRYING OUT THE INVENTION

Figure 1:
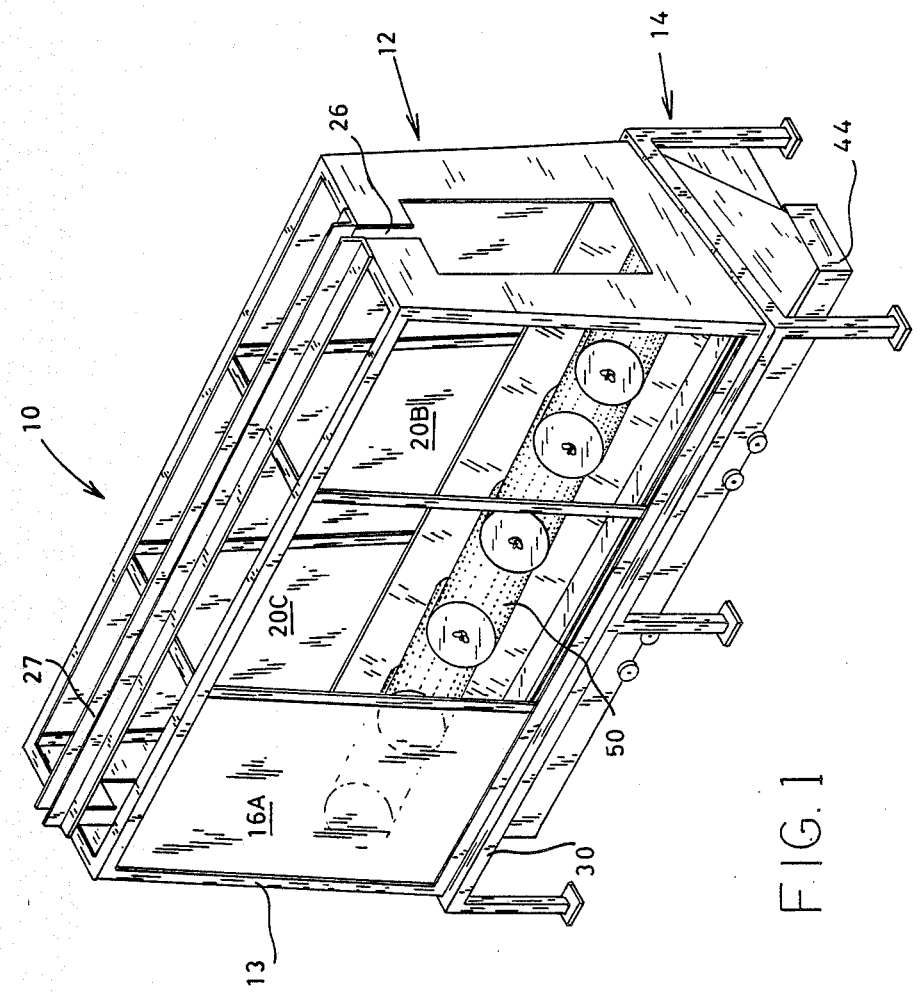
FIG. 1 illustrates a perspective view of a powder spray booth of the present invention in which two front wall panels and the ceiling panels have been removed from the spray chamber portion of the booth.

A powder spray booth incorporating various features of the invention is shown generally at 10 in the figures. The booth 10 includes a spray chamber portion, shown generally at 12 in the figures, and a base portion, shown generally at 14 in the figures, which is located directly beneath the spray chamber 12. Referring to FIGS. 2 and 3, the spray chamber 12 is a substantially , rectangular volume defined by a frame 13, two oppositely disposed end panels 15A and 15B, ceiling panels 18A and 18B. one or more front panels 16A, 16B and 16C, and one or more rear panels 20A, 20B and 20C. It will be appreciated by those skilled in the art that the number of front and rear panels, 16 and 20, respectively, can be varied according to the length of booth desired. The front and rear panels, 16 and 20, respectively, are constructed of a lightweight, non-conductive material such as Lexan ®, a translucent synthetic manufactured by General Electric Company. In the preferred embodiment, the front and rear panels, 16 and 20, respectively, are sloped slightly inwardly toward the top panels 18A, 18B, as shown in FIG. 3, to minimize the amount of oversprayed powder which adheres to such panels. Further, a simple rap of the hand will cause most of any powder adhering to the panels to fall into the collection section 34 hereinafter described in greater detail. Referring to FIGS. 5 and 5A, the frame 13 is provided with channels dimensioned to receive the front and rear panels, 16 and 20, in such a manner that the panels can be easily and quickly removed from or reinserted into the frame 13 with a lift-up/slide-out or lift-up/slide-in motion. This is accomplished by providing an upper channel 21 in the frame 13 having sufficient excess volume that a panel, e.g. 16A, can be lifted into the upper channel 21 and out of a lower channel 22 and then slid out of the upper channel 21 to completely remove the panel 16A from the booth 10. FIG. 5 shows the panel 16A as it is normally installed in the frame 13. FIG. 5A shows the panel 16A as it appears when it is lifted up to allow it to be slid out of the frame 13.

The ceiling panels 18A and 18B are dimensioned to be simply laid into the top portion of the frame 13 of the spray chamber 12 and are constructed of a lightweight material. Because of the lightweight, lay-in character of the ceiling panels 18A and 18B, they comprise the "weakest" (least resistant to pressure created within the booth) point of the booth 10. Accordingly, the ceiling panels 18A and 18B comprise a "safety valve" which will be blown out and relieve any pressure caused by a fire within the booth.

Referring to FIG. 3, it can be seen that the end panel 15A is provided with a large rectangular opening 24 proximate the center of the end panel 15A and a smaller rectangular opening 26 which extends from the opening 24 to the top edge of the end panel 15A. The oppositely disposed end panel 15B is provided with similar openings. During powder spraying operations, the articles (not shown) to be sprayed are conveyed through the spray chamber 12 of the booth 10 with such articles entering the booth 10 through a large opening 24 in one of the end panels 15A or 15B, and exiting the spray chamber 12 through the corresponding opening 24 in the oppositely disposed end panel. The articles are suspended on hangers (not shown) which are secured to an overhead conveyor (not shown). Referring to FIG. 1, the hangers are conveyed through the booth 10 via an opening 27 which traverses the length of the booth and is defined by that portion of the frame 13 which supports the ceiling panels 18A and 18B and the openings 26 in the end panels 15A and 15B. It will be appreciated by those skilled in the art that one or more of the front and/or rear wall panels, 16 and 20, respectively, of the spray chamber 12 will be provided with one or more openings dimensioned to accommodate the specific type of spray gun intended to be used with the booth 10. An example of such an opening is shown at 25 in FIG. 2. The spray chamber 12 is open at the bottom and is secured to the base portion 14 of the booth 10 to form an integrated unit.

The base portion 14 of the booth 10 includes a frame section 30 to which the spray chamber 12 is secured proximate the open bottom of the spray chamber 12. A plurality of support means or legs 32 are provided to support the booth 10 above a floor. The base portion 14 further includes a powder collection section 34 and a clean air plenum section 36. The collection section 34 is a trough-like section which is open at the bottom and is substantially defined by the frame section 30, a front wall section 38, a rear wall section 40, and end panels 42A and 42B. The front and rear wall sections 38 and 40 are sloped inward toward the floor as shown in FIG. 3. The collection section 34 is open at its bottom, with such opening being defined by the lower most edges of the front and rear walls 38 and 40 and the end panels 42A and 42B. A removable drawer or hopper 44 is provided for installation beneath the open bottom of the collection section 34. The drawer 44 is an open top container which is dimensioned such that all oversprayed powder that is directed to the bottom opening of the collector section 34, as most will be, is collected in the drawer 44. In the preferred embodiment, the drawer 44 is provided with wheels 46 to facilitate its installation and removal. It will be appreciated by those skilled in the art that, where desirable, the drawer 44 can be replaced by a container incorporating a fluidizer to accommodate an automatic powder transfer system.

Referring to FIG. 3, the powder collection section 34 further includes filter means. The filter means comprise one or more canister type filters 50 secured to the rear wall 40 of the collection section 34. Each filter 50 is connected to the wall 40 by a cantilevered frame 52, i.e. the frame 52 is secured to the wall 40 at one end and is unsupported at the opposite end. When the filter 50 is installed, it is simply slid onto the frame 52 which includes a threaded rod portion 54 which extends through an opening provided in the outboard end plate of the filter 50. The filter is then secured to the frame 52 by a wingnut 56 or similar type fastener which is screwed onto the threaded rod portion 54. An opening (not shown) extends from the interior of the filter 50 through the frame 52 and the wall 40 into the clean air plenum section 36 (hereinafter described in greater detail) whereby air can be drawn from the spray chamber 12 through the filter 50 and into the plenum 36. The clean air plenum section 36 of the base portion 14 of the booth 10 is defined by the rear wall 40 of the collection section 34, a back wall panel 60, two oppositely disposed end panels 62A and 62B, and a floor panel 64. The back wall panel 60 is substantially vertical and the floor panel 64 is substantially parallel to the floor, i.e. horizontal. An exhaust port 66 is provided in the back wall panel 60 of the plenum 36 for connection to a blower (not shown) which draws air from the plenum 36 and creates a negative atmospheric pressure therein; and, therefore, air is drawn from the spray chamber 12 through the filter 50 into the plenum 36 to create a negative atmospheric pressure in the spray chamber 12. Air valves 68 which are connected to an external source of compressed air (not shown) are located within the plenum 36 whereby periodic reverse pulses of compressed air can be directed back through the filters 50 to eject oversprayed powder which has collected on the filters. Control means (not shown) are provided to regulate the frequency of the pulses. The back panel 60 is comprised in part by one or more removable panels 70 which permit access to the plenum 36 to service the air valves 68, etc.

In light of the foregoing, it can be seen that a powder spray booth 10 is disclosed in which articles to be sprayed are hung from an overhead conveyor and conveyed through an opening 24 in one end, e.g. 15A of a spray chamber 12, into the spray chamber 12 to be sprayed and then out of the spray chamber through a corresponding opening 24 in an oppositely disposed end panel, e.g. 15B. While in the booth, the articles are sprayed with powder from a spray gun inserted into the spray chamber 12 through an opening provided in a front or rear wall panel, 16 or 20, respectively. Heavier particles of powder which do not adhere to the article being sprayed will fall by gravity into the base portion 14 of the booth 10, lighter particles will be entrained in the air within the booth 10. The heavier particles will slide down the sloped walls 38 and 40 of the powder collection section 34 of the base portion 14 into the drawer 44. At all times during the spraying operation, air will be drawn from the spray chamber 12 through the filter(s) 50 into the clean air plenum section 36 of the base 14 from which it will be exhausted to the atmosphere via a blower connected to the exhaust port 66 of the plenum 36. The lighter weight particles of oversprayed powder which have become entrained in the air within the spray chamber 12 will be collected on the exterior surfaces of the filter canisters 50. Periodic pulses of compressed air directed from the air valves 68 back through the filters 50 will eject the collected powder which will be of sufficient weight that most will fall by gravity into the drawer 44 as previously described for heavier particles of oversprayed powder. Accordingly, a powder spray booth is provided which includes an integral powder recovery/filtration system.

When it is desired that the booth 10 be cleaned to accommodate a powder color change, the front and rear panels, 16 and 20, respectively, can be simply and quickly removed by lifting them up and sliding them out of the frame channels. The panels can be vacuumed or wiped clean and set aside. By removing the panels, wide open access is provided to the booth. The filter canisters 50 can be removed quickly by removing the wingnut 56 from the threaded rod 54 and sliding the filter off of the frame 52. The filter canisters are then stored until the color powder for which they were used is to be sprayed again, because it is not possible to clean one hundred percent of the powder from them. The drawer 44 is then removed from the booth so that the powder collected therein can be removed and stored for reuse. The drawer can then be cleaned quickly and easily with a vacuum cleaner for reinstallation after the booth has been cleaned. Because the drawer 44 is a relatively inexpensive component of the booth 10, a spare can be maintained if desired. If a clean spare is available, the process of removing and storing the collected powder and cleaning the drawer 44 can be delayed until after the color changeover has been completed, thereby reducing downtime further if manpower is limited. With the filters, drawer and wall panels removed, the entire remaining part of the booth can be quickly and easily cleaned with a vacuum cleaner using a relatively short extension wand; it is unnecessary for someone to climb into the booth because of the wide open access provided. After the booth has been vacuumed clean, filter canisters for the new color can be installed and the cleaned wall panels and drawer reinstalled. The booth is then ready for spraying with a different color powder.

In trials using a prototype of the booth of the present invention, color changeovers have been accomplished in less than thirty minutes. The entire booth 10 can be cleaned in the same or less time than the spray chamber alone of prior art booths utilizing rollaway filter/recovery modules. Because of the simplified construction and no requirement to maintain a spare filter/recovery module, the booth of the present invention is far less expensive to manufacture and maintain than prior art booths utilizing rollaway modules. An important feature of the present invention which significantly contributes to the reduced down time during color changeovers is the location and cantilevered support of the filter elements 50 in conjunction with the wide open access provided by the lift-up/slide-out wall panels 16 and 20 of the spray chamber 12. When the panels are removed from the booth, there are no obstructions to accessing the filters which are held in place by a single wingnut which can be removed in seconds.

It will be appreciated by those skilled in the art that the booth of the present invention substantially reduces the risk of explosion which is a concern in any powder spraying operation. Because the powder collection section 34 and drawer 44 is located directly below the spray chamber 12 with no obstructions (other than the filter elements) to air flow from the spray chamber, any fire which might occur therein will be vented by the air in the spray chamber which is in turn extensively vented by the openings in the end panels and ceiling of the spray chamber. Further, the ceiling panels 18A and 18B are constructed of a lightweight material and are simply laid into the frame 13 of the spray chamber 12. Accordingly, any pressure buildup as a result of fire in the booth which was not completely relieved through the openings in the spray chamber 12 would blow the ceiling panels 18A and 18B out, leaving the top of the booth completely open to the atmosphere, making explosion within the booth nearly impossible.

While a preferred embodiment has been shown and described, it will be understood that it is not intended to limit the invention to such disclosure, but rather it is intended to cover all modifications and alternate constructions falling within the scope of the invention as defined in the appended claims.

I claim:

1. A powder spray booth for spray coating articles with powder using a spray gun, said powder spray booth being connectable to an external blower means, said spray booth comprising:

a spray chamber defined by a pair of oppositely disposed end walls and front and rear walls thereby defining an interior volume wherein said articles are sprayed, said spray chamber defining a first opening in said front wall for receiving said spray gun therethrough and a further opening in a selected one of said front wall and said rear wall for accessing said interior volume for cleaning, said spray chamber having an open bottom portion;

closure means for selectively closing said further opening, said closure means including top and bottom frame members provided with cooperating channels and removable panel members disposed in said channels, said panel members being inserted into said channels by a lift-up/slide-in motion and being removed from said channels by a lift-up/slide-out motion;

a base portion secured to said open bottom portion of said spray chamber, said base portion including an oversprayed powder collection section disposed beneath said spray chamber, said oversprayed powder collection section having at least two oppositely disposed downwardly converging sidewalls, a clean air plenum section having a common wall with said oversprayed powder collection section, and means for supporting said booth above a floor, said oversprayed powder collection section having an open top portion which cooperates with said open bottom portion of said spray chamber whereby heavier particles of oversprayed powder fall by gravity into said oversprayed powder collection section and whereby said oversprayed powder collection section is accessible through said further opening in said spray chamber;

cantilevered support means attached to said common wall between said clean air plenum section and said oversprayed powder collection section;

filter means supported on said support means and in fluid communication with said clean air plenum section, said filter means comprising at least one canister-type filter element provided with an axial passageway, said filter means accessible from said further opening of said spray chamber;

fastening means for releasably securing said filter means to said common wall between said oversprayed powder collection section and said clean air plenum section an exhaust port means for connection to said external blower means, said exhaust port means being positioned in an exterior wall panel of said clean air plenum section whereby air is drawn from said spray chamber through said filter means into said clean air plenum section through an opening in said common wall and exhausted exterior to said booth by said blower means, thereby causing lighter oversprayed powder particles entrained in said air to be collected on an exterior surface of said filter means; and container means releasably secured to said base portion proximate an opening defined by a bottom portion of said oversprayed powder collection section whereby heavier particles of oversprayed powder fall by gravity into said container means.

2. The powder spray booth of claim 1 wherein said filter means comprises at least one canister-type filter element provided with an axial passageway, and said releasable attaching means comprises a threaded rod member attached to said support means and passing through said axial passageway, with a threaded fastener means engaged with said threaded rod member for releasably securing said filter means.

3. The powder spray booth of claim 1 wherein said spray booth further comprises at least one ceiling panel supported a top portion of said frame means.

4. The spray booth of claim 1 wherein said front wall panel and said rear wall panel are downwardly diverging from each other.

* * * * *